United States Patent [19]

By et al.

[11] Patent Number: 5,431,536
[45] Date of Patent: Jul. 11, 1995

[54] MOLDED TORQUE CONVERTER STATOR AND INTEGRAL RACE FOR A ONE-WAY TORQUE TRANSMITTER

[75] Inventors: Robert R. By, New Baltimore; Donald G. Maddock, Ypsilanti; Theodore E. Hojna, Sterling Heights, all of Mich.

[73] Assignee: General Motors Corporation, Detroit, Mich.

[21] Appl. No.: 189,818

[22] Filed: Feb. 1, 1994

[51] Int. Cl.$^6$ ............................................. F01D 1/02
[52] U.S. Cl. ............................................. 415/200
[58] Field of Search ............................... 415/200

[56] References Cited

U.S. PATENT DOCUMENTS

| | | | |
|---|---|---|---|
| 5,094,076 | 3/1992 | Henricks | 60/345 |
| 5,141,396 | 8/1992 | Schmidt et al. | 415/200 |

*Primary Examiner*—John T. Kwon
*Attorney, Agent, or Firm*—Donald F. Scherer

[57] ABSTRACT

A torque converter stator has a plurality of blades integrally molded between inner and outer rim portions. The inner rim portion has an outer race of a one-way torque transmitting device integrally molded therewith. The outer race includes a plurality of cam surfaces and spring abutment surfaces for the one-way device which cooperate with roller, springs and an inner race which are later assembled therewith to complete the one-way torque transmitting device.

1 Claim, 1 Drawing Sheet

MOLDED TORQUE CONVERTER STATOR AND INTEGRAL RACE FOR A ONE-WAY TORQUE TRANSMITTER

TECHNICAL FIELD

This invention relates to torque converter stators, and more particularly, to molded composite material stators.

BACKGROUND OF THE INVENTION

It is known to mold torque converter stators utilizing a composite or plastic material. Such stators have been used for a number of years by at least one automobile manufacturer in the United States. The U.S. Pat. No. 5,094,076, issued to Henricks on Mar. 10, 1992, describes a molded plastic stator. In this patent, the molded stator has integrally molded therewith a metal one-way clutch assembly. The clutch assembly must be preheated and placed in a mold prior to injecting the plastic into the mold. Thus, the operations of heating the one-way clutch assembly and some of the cleanup steps required after removal from the mold require extra time and energy to create the device. While clutch assemblies are useful, it is believed that significant production costs and time can be reduced.

SUMMARY OF THE INVENTION

It is an object of the present invention to provide an improved torque converter stator with an integral device for a one-way torque transmitter.

It is another object of this invention to provide an improved torque converter stator molded from a composite thermoplastic, wherein the outer race for a one-way torque transmitter is molded simultaneously with the stator blades.

The present invention will reduce the mold time, since it will not be necessary to preheat the metal components within the molds since none are provided. It is also found that with the present invention, it is possible to use a composite thermoplastic, such as Polyphenylene Sulfide. This composite material will allow for a simple injection molding process requiring approximately one minute without heat treatments.

The cam for the one-way torque transmitting device is molded as part of the stator assembly thereby providing for controlled tolerances. This allows for a more accurate assembly which is beneficial to the life of the product. The composite molded stator provides other benefits in that it permits the blades to be tapered from the core to the shell. That is, from an inner annular rim to an outer annular rim. This provides for better flow guiding across the stator blades. This process also permits the blade gap at the exit between two adjacent blades to be maintained at approximately 0.54 mm as compared with as compared with 3 mm for an aluminum casting stator.

Since the Polyphenylene Sulfide permits a low temperature molding process, an improved quality is attained since more accurate molding dimensions, less variation in manufacturing quality and an improved surface finish is provided.

DESCRIPTION OF AN EXEMPLARY EMBODIMENT

Figure 2:
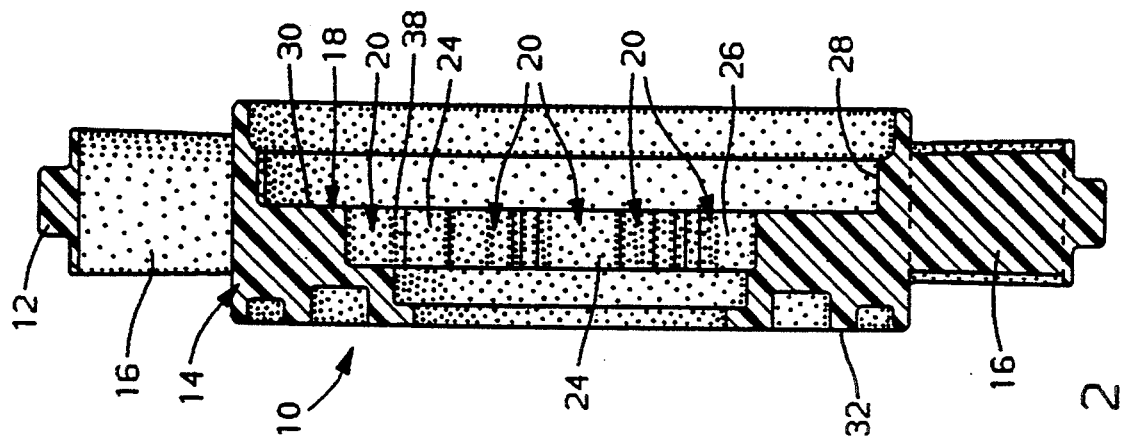
FIG. 2 is a view taken along line 2—2 of FIG. 1.
Figure 1:
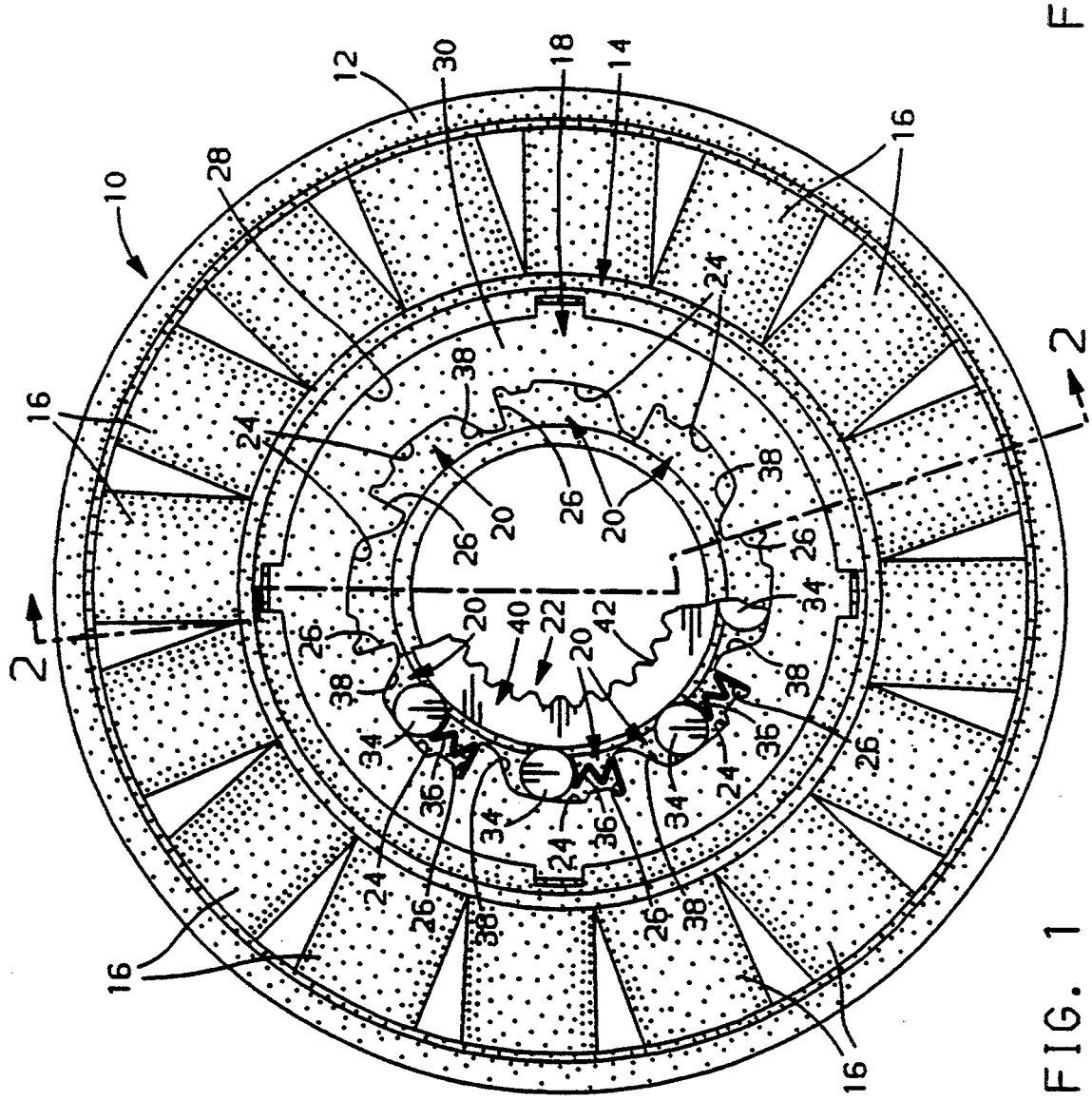
FIG. 1 is an elevational view of a stator molded in accordance with the present invention with further components of a one-way torque transmitting device installed.

As seen in FIGS. 1 and 2, a composite one piece molded stator 10 has an outer rim 12, an inner rim or annular wall 14 and a plurality of blades 16 formed between the rim 12 and wall 14. The inner wall 14 has an annular body portion 18, the radially inner surface of which is formed to provide a plurality of pockets 20 for a one-way torque transmitter device 22.

Each of the pockets 20 has a radial outer cam surface 24 and a spring abutment surface 26. The body portion 18 has a large opening 28 which extends rightward as seen in FIG. 2, and is defined by a wall 30. The wall 30 is utilized to locate a washer or ring, not shown, which is installed to close a portion of the one-way torque transmitter 22 at the impeller side of the stator. The body 18 has an annular radial wall 32 on the turbine side of the impeller which will provide a thrust surface. This thrust surface is normally, with aluminum castings, a needle bearing which requires a separate assembly and means for securing the needle bearing into the stator.

After the stator 10 has been molded, the one-way torque transmitting device can be further assembled therein by installing a roller 34 in each pocket 20 and a spring 36 between each spring abutment surface 26 and the roller 34. The spring 36 will urge the rollers 34 clockwise until each is held in abutment between respective cam surfaces 24 and an inner race 40. In this position, the rollers 34 are spaced from respective end walls 38 of the pockets 20. The inner race 40 is generally a metal component and has a splined inner diameter 42 adapted to engage with or be drivingly connected to a stator support shaft, not shown, in a well known manner. Once the roller, springs and inner race have been installed, a closing washer or wall member is inserted in the opening 28 in abutment with the wall 30. This will complete the assembly of the stator and one-way torque transmitter.

The stator 10 is molded with a thermoplastic material, such as Polyphenylene Sulfide which has a much lower specific gravity than the heat resistant thermoplastic resin used in the prior art. The thermo setting plastic resin used in the prior art generally includes a thirty-five percent fiberglas filled grade RX 865 phenolic resin which is available from Rogers Corporation.

The composite thermoplastic material used with the present invention permits injection molding at a lower temperature without prior heat treatment and reduces the process time considerably compared to the prior art.

The embodiments of the invention in which an exclusive property or privilege is claimed are defined as follows:

1. A one piece molded torque converter stator comprising:
   an outer annular portion;
   an inner annular portion;
   a plurality of fluid directed blades molded integrally with an interconnecting said outer and inner annular portions to define a plurality of flow paths; and
   an outer race of a one way torque transmitter molded integrally with the inner annular member, said outer race including a plurality of pockets each having a cam surface and a spring abutment support wall adapted to cooperate with a plurality of rollers and springs of a one-way torque transmitting device, said entire stator being formed of a thermoplastic material.

* * * * *